United States Patent [19]
Lefevre

[11] Patent Number: 5,975,272
[45] Date of Patent: Nov. 2, 1999

[54] TORSION DAMPING DEVICE

[75] Inventor: Gérard Lefevre, Saleux, France

[73] Assignee: Valeo, Paris, France

[21] Appl. No.: 08/702,472

[22] PCT Filed: Dec. 18, 1995

[86] PCT No.: PCT/FR95/01684

§ 371 Date: Dec. 4, 1996

§ 102(e) Date: Dec. 4, 1996

[87] PCT Pub. No.: WO96/20356

PCT Pub. Date: Jul. 4, 1996

[30] Foreign Application Priority Data

Dec. 23, 1994 [FR] France ................................. 94/15612

[51] Int. Cl.⁶ ............................ F16F 15/129; F16D 13/68
[52] U.S. Cl. ................................ 192/213.12; 192/213.11
[58] Field of Search ........................ 192/213.12, 213.11, 192/213.1, 213.22, 213.21, 213.2; 464/68

[56] References Cited

U.S. PATENT DOCUMENTS

| | | |
|---|---|---|
| 4,274,525 | 6/1981 | Raab et al. ........................ 192/213.31 |
| 4,570,775 | 2/1986 | Caray et al. ....................... 192/213.31 |
| 4,669,594 | 6/1987 | Weissenberger et al. ......... 192/213.22 |
| 4,700,822 | 10/1987 | Maucher et al. ................... 192/213.12 |
| 4,782,933 | 11/1988 | Jackel et al. .................... 192/213.22 X |
| 5,117,959 | 6/1992 | Graton ........................... 192/213.22 X |
| 5,217,409 | 6/1993 | Dalbiez .......................... 192/213.22 X |

FOREIGN PATENT DOCUMENTS

| | | |
|---|---|---|
| 2365728 | 4/1978 | France . |
| 2509400 | 1/1983 | France . |
| 2532019 | 2/1984 | France . |
| 451722 | 11/1927 | Germany . |
| 4304778 | 8/1993 | Germany . |

*Primary Examiner*—Rodney H. Bonck
*Attorney, Agent, or Firm*—Longacre & White

[57] ABSTRACT

A torsion damping device provided with an associated friction device. The torsion damping device includes a washer (60) frictionally engaging a disk (11) under axial action of spring lugs (63) bearing on a guiding washer (12B). The washer has a substantially annular shape and acts radially beyond an elastic damping member (15, 15a).

5 Claims, 1 Drawing Sheet

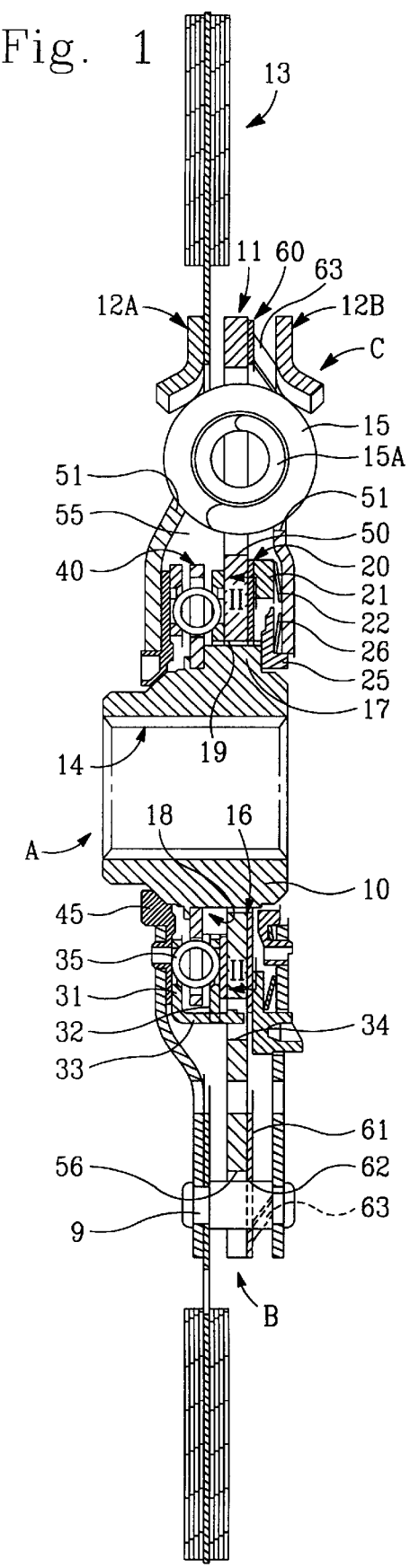
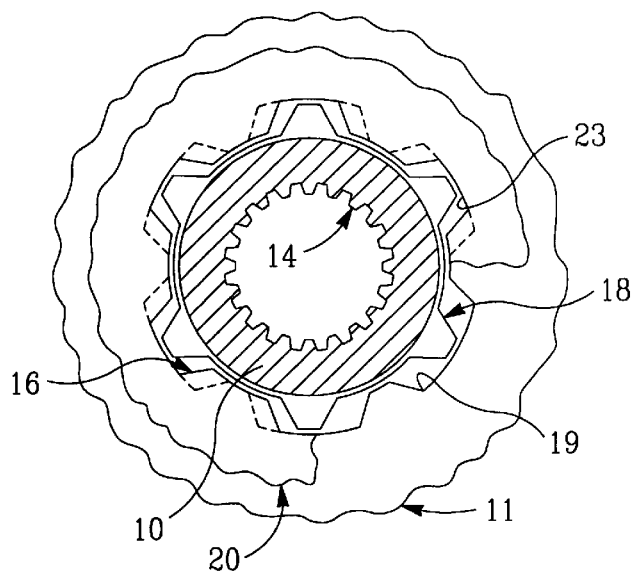
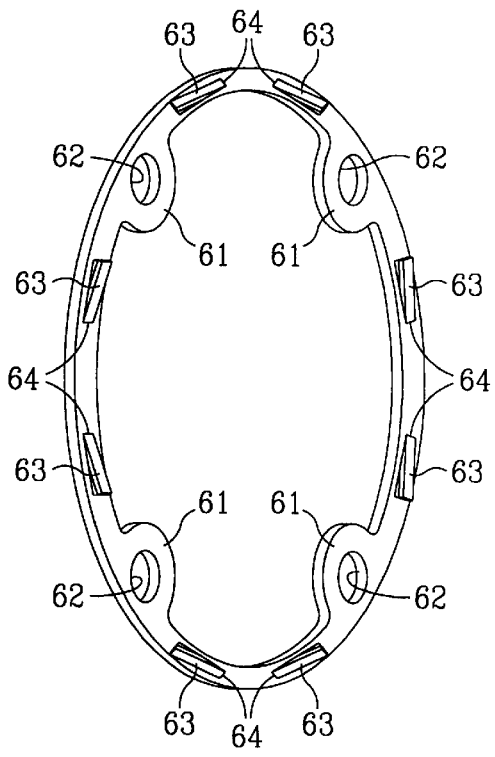

TORSION DAMPING DEVICE

BACKGROUND OF THE INVENTION

1. Field of the Invention

The present invention concerns a torsion damping device of the type having at least two coaxial parts, mounted rotatably in relation to one another, counter to elastic damping means generally interposed circumferentially between them. Such a torsion damping device can be applied to a friction clutch, notably for a motor vehicle. The invention more particularly concerns a friction device acting between the coaxial parts.

2. Description of the Prior Art

In a known torsion damping device one of the rotary parts carries a friction disc, designed to be fixed with respect to rotation to a first shaft, in practice a driving shaft, the crankshaft of the engine in the case of an application to a motor vehicle, whilst another of the said rotary parts has a hub by means of which it is designed to be fixed with respect to rotation to a second shaft, in practice a driven shaft, the input shaft of a gearbox in the case of such a motor vehicle.

In such an assembly, the use of at least three rotary coaxial parts, one of these comprising a hub disc, is also known.

The damping device acts between this rotary part and that fixed to the driving shaft. The delimitation of the angular movement between this rotary part and that fixed to the driven shaft is provided by engagement means of meshing with clearance. A sub-assembly for preliminary torsional damping is generally interposed between these latter two rotary parts.

The interposing of an axially acting friction device between two rotary coaxial parts is also known. Such a device generally comprises a friction washer, one active surface of which rubs against one of the rotary parts, and elastic loading means axially forcing the friction washer towards the rotary part whilst bearing on the other rotary part.

In the known device mentioned above with three coaxial parts, two friction devices of this type are generally disposed, one, corresponding to the damper, between the rotary part connected to the driving shaft and the hub disc, and the other, corresponding to the preliminary damper, between the rotary part connected to the driving shaft and the rotary part connected to the driven shaft.

These friction devices are generally in the vicinity of the hub, in a space left free around the latter, delimited circumferentially by elastic damping means.

Also housed in this space is the sub-assembly for preliminary torsional damping.

It is thus complicated to install in this space other active devices such as, for example, devices for damping the end-of-travel impacts of the means of meshing with clearance.

SUMMARY OF THE INVENTION

The present invention relates to a device notably enabling this drawback to be eliminated.

To this end a novel torsion damping device is proposed, notably for the clutch of a motor vehicle, having two coaxial parts mounted rotatably in relation to one another, counter to elastic damping means interposed circumferentially between them, and an axially acting friction device, the latter comprising a friction washer subjected to the axial action of elastic loading means, characterised in that the friction washer is of substantially annular shape, and has a large internal diameter, so as to act radially beyond the elastic damping means, and in that the friction washer is slidably mounted on connecting braces between two washers guiding one of the rotary parts so that it is immobilised in rotation in relation to the latter.

In this way, the space occupied by the friction washer and by the corresponding elastic loading means is made free in the zone delimited by the hub on the one hand and the elastic damping means on the other.

This free space can be used to advantage, for example for installing, radially inside the friction washer, a slide washer and its own load, as will be explained further in the detailed description which is given by way of example.

It will be appreciated that the guiding washers are unaltered.

According to another aspect of the present invention, taking into account the mounting of the friction washer on the braces, the elastic loading means for the friction washer consist of elastic lugs cut out of the washer. The necessity of disposing an elastic washer, such as a Belleville washer, adapted to act axially on the friction washer, as is the case with the damping devices cited above, is thus avoided. There is thus a reduction in the number of parts.

Other characteristics and advantages of the invention will also emerge from the description which follows by way of example, with reference to the drawings, in which:

BRIEF DESCRIPTION OF THE DRAWINGS

FIG. 1 is a partial view in section of a torsion damping device according to the invention;

FIG. 2 is a view in section of a central part of FIG. 1, along the line II—II, with local cut-aways;

FIG. 3 is a perspective view of a friction washer participating in the torsion damping device according to the invention.

DETAILED DESCRIPTION OF THE PREFERRED EMBODIMENT

These figures illustrate by way of example the application of the invention to a torsion damping device which, designed to form a friction clutch for the clutch of a motor vehicle, has, successively mounted rotatably two by two in relation to each other, three coaxial parts, namely a part A, consisting essentially of a hub 10, a part B, consisting essentially of a hub disc 11, which surrounds the hub 10, and a part C, consisting essentially of two guiding washers 12A and 12B, disposed on either side of the hub disc and surrounding the hub 10, joined one to the other by braces 9 of axial orientation and thus having the same rotational movement.

The coaxial part C has a friction disc 13, whose friction linings are designed, in a known manner, to be gripped between two plates of a clutch connected in rotation to a driving shaft, the output shaft of the engine in the case of a motor vehicle.

The hub 10 for its part has internal flutes 14, designed to join it to a driven shaft in rotation, the input shaft of the associated gearbox in the case of such a motor vehicle.

The disc 11 is provided on its external periphery with notches 56, open towards the outside and extending circumferentially, adapted to allow the passage of the braces 9 with circumferential clearance.

The coaxial parts B and C are mounted rotatably in relation to one another, counter to elastic means interposed circumferentially between them.

These elastic means consist, in the embodiment depicted, of pairs of springs 15, 15a of the helical spring type, the springs 15a being situated on the inside of the springs 15. More precisely, several pairs of springs 15 and 15a are evenly distributed about the axis of rotation of the parts B and C, extending along tangents to one and the same circle centred about this axis.

In a manner well known per se, each pair of springs 15, 15a is mounted in apertures 50, 51 produced opposite one another in the disc 11 and the guiding washers 12A and 12B.

The assembly formed by the coaxial parts B, C and the groups of springs 15, 15a constitutes the principal damping device of the friction clutch.

Its mode of operation, which is well known, will not be described in further detail and is not the concern of the present invention.

The coaxial parts A and B are also mounted rotatably in relation to one another, counter to elastic preliminary damping means, within the limits of an angular movement determined by the means of meshing with clearance 16.

In practice, the hub 10 has on a longitudinal portion 17 of its external periphery radial projections 18 forming a male toothing. The hub disc 11 for its part has on its internal periphery, opposite the portion 17 of the hub 10, notches 19, of angular aperture greater than those of the hub teeth, thus forming a female toothing, here of trapezoidal shape like the complementary male toothing 18. A tooth 18 is engaged with circumferential clearance in each notch 19, the possible angular movement between the coaxial parts A and B thus being limited by the abutment of the teeth 18 of the hub 10 with the corresponding sides of the notches 19 in the disc 11. These teeth and notches thus form the aforementioned means of meshing with clearance 16.

The device is completed by a sub-assembly for preliminary damping comprising notably a preliminary damping cartridge of a known type arranged between the hub disc 11 and the hub 10.

As can be seen in FIG. 1, this cartridge, with the same axis as the rotary parts A, B and C, is housed by virtue of a free space 55 situated radially between the hub 10 and the pairs of springs 15, 15a. Axially, this cartridge is situated in the part of the free space 55 situated between the disc 11 and the guiding washer 12A.

It consists of a secondary disc 40 joined to the hub by crimping, and two flanges 31 and 32 situated on either side of the secondary disc 40 and connected to the hub disc 11 by fingers 33. More precisely, these fingers 33, which, projecting from the metal flange 31, allow, by snapping-in, a connection between the two flanges 31, 32, are engaged in openings 34 in the hub disc 11 so that the flanges 31 and 32 are rotated with the hub disc 11. Circumferentially acting elastic preliminary damping means 35, in practice springs of lower stiffness than the springs 15, 15a, are interposed between the flanges 31, 32 on the one hand and the secondary disc 40 on the other hand, in a conventional arrangement. They are thus forced elastically by a relative rotation of the hub disc 11 and of the hub 10 and tend to oppose this rotation. A friction washer can be interposed between the preliminary damping cartridge and the hub disc 11.

The operation of such a preliminary damping cartridge is known per se and will not be described in more detail.

As a matter of interest, it is pointed out that in a first phase the preliminary damping springs 35 are compressed, the guiding washers 12A, 12B and the disc 11 forming a rigid assembly by means of the stiffer pairs of damping springs 15, 15a, this movement continuing until the clearance of the means of meshing with clearance 16 is eliminated. Thereafter the preliminary damping springs 35 remain stretched and a relative movement occurs between the disc 11 and the guiding washers with the action of the pairs of damping springs 15, 15a.

According to an important characteristic of the invention, the torsion damping device also comprises a friction device acting axially between the coaxial rotary assemblies B and C, acting in parallel with the elastic damping means.

This friction device comprises a washer 60, depicted alone in FIG. 3.

This friction washer 60, in this case metallic, is of substantially annular shape with a large internal diameter. More precisely, it comprises an active part of annular shape with, extending towards the inside, radial arms 61 forming means of connection with the connection braces 9 between the guiding washers 12A and 12B.

In practice, each radial arm 61, of rounded shape, has a bore 62 adapted to be passed through by a brace 9, as can be seen in FIG. 1.

Thus connected to the braces 9, the washer 60 is held centred and immobilised in rotation in relation to the rotary assembly C. It can, however, move axially by sliding along the braces 9.

As can be seen clearly in FIG. 1, the internal diameter of the washer 60 is sufficiently large that its active part is situated radially beyond the pairs of springs 15, 15a. It therefore acts in the vicinity of the external periphery of the hub disc 11.

The washer is positioned axially between the disc 11, against which its active part is in contact, and the guiding washer 12B.

On the active part of this washer are cut lugs 63 of rectangular shape. Each of these lugs extends approximately circumferentially from a radial side 64 connecting with the active part of the washer. These lugs act at regular intervals all around the washer, in pairs disposed back to back, that is to say their sides 64 being situated facing one another.

Advantageously, and as depicted in FIG. 3, one pair of lugs 63 acts in each quarter of the washer extending between two braces 9.

These lugs are shaped so as to be inclined towards the guiding washer 12B. Since their ends bear on the inner surface of the guiding washer 12B, radially beyond the apertures 51, these lugs form elastic loading means adapted to axially force the friction washer 60 against the disc 11 and to grip the cartridge between the guiding washer 12A and the disc.

In the plane of the washer 60, radially to the inside of the latter, in the free space 55 between the hub 10 and the springs 15, 15a, is installed a washer for damping the end-of-travel impact 20 said slide washer, coaxial to the hub disc 11 and placed against the latter on the side opposite the preliminary damping cartridge.

This slide washer 20 has on its inner circumference a female toothing 23 facing the teeth 18 of the male toothing on the hub 10, analogous to that on the hub disc 11 but having notches 23 narrower than the notches 19 formed on the hub disc 11. One tooth 18 of the hub 10 is engaged in each notch 23 of the slide washer 20, forming a means of meshing with clearance between the slide washer and the said hub 10.

The slide washer 20 is forced axially against the surface of the disc 11 by an axially acting elastic loading means comprising a Belleville washer 22, interposed under stress between the guiding washer 12B and an application washer 21, fixed in rotation on the washer 12B by pins engaged in holes in the latter.

Thus loaded, the slide washer 20 is adapted to rub against the disc 11.

When the hub disc 11 and the hub 10 have an angular movement of in relation to one another, the teeth 18 move in the notches 19 and 23. The notches 23 being narrower than the notches 19, contact between the teeth 18 on the hub 10 and the notches 23 occurs before the engagement between the teeth 18 and the edges of the notches 19.

The washer 20, immobilised in relation to the hub 10, then rubs against the disc 11, braking the angular movement of the latter in relation to the said hub.

In this way, the force of the impact of the teeth 18 against the edges of the notches 19 in the disc 11 can be reduced.

The parameters determining the braking obtained by this slide washer, that is to say the coefficient of friction of the slide washer 20 and its load, in practice determined by the choice of the elastic washer 22, can be controlled independently of the friction device 60 acting between the coaxial assemblies B and C.

In the example embodiment depicted in FIG. 1, a friction device acting in parallel with the elastic preliminary damping means is installed radially to the inside of the loading means 21 and 22 of the slide washer 20.

This device comprises a friction washer 25 which, fixed in rotation on the guiding washer 12B by pins engaged in holes in the latter, is forced axially against the hub 10 by a Belleville washer 26 interposed under stress between it and the said guiding washer 12B.

A cone bearing 45, connected in rotation to the guiding washer 12A by pins engaged in holes in the latter, is interposed radially between the guiding washer 12A and a conical surface of the hub 10. Axially, this bearing 45 is interposed between the guiding washer 12 and the flange 31. The bearing 45 thus permits a centring of the guiding washers 12A, 12B in relation to the hub 10 whilst preventing metal-to-metal friction between the flange 31 and the guiding washer 12A.

Naturally, the disc 13 can be devoid of friction linings and be fixed directly to a plate fixed to the crankshaft of the vehicle.

The cartridge can be fitted with flanges 30, 31 made from plastic.

Finally, the limitation of the relative angular movement between the disc 13 and the assembly formed by the hub 17 and the disc 11 can be achieved by means of contiguous turns of the springs 15, 15a. In this case, the braces 9 can then extend radially beyond the disc. The connection means 61 for the washer 60 will then be radially offset towards the outside in relation to the active part of the washer.

In all cases, the active part of the washer 60 is located in the vicinity of the external periphery of the disc 11, so that higher frictional torque is obtained.

This robust washer 60 is advantageously made from metallic material, given that a metal-to-metal contact is preferable with regard to the coefficient of friction, but can also be made from fibre-reinforced plastic.

I claim:

1. A torsion damping device having two coaxial parts (B and C) mounted rotatably in relation to one another, counter to elastic damping means (15, 15a) interposed circumferentially between them, and an axially acting friction device, the latter comprising a friction washer (60) subjected to the axial action of elastic loading means (63), characterised in that said friction washer is of substantially annular shape, and has an internal diameter, so as to act radially beyond the elastic damping means (15, 15a) by means of an active part, and in that the friction washer (60) is slidably mounted on connecting braces (9) between two washers (12A, 12B) guiding one of the rotary parts (C) so that it is immobilized in rotation in relation to the latter and the elastic loading means (63) for the friction washer (60) comprises elastic lugs cut out of the washer.

2. The torsion damping device according to claim 1, wherein the friction washer (60) is provided with means (61) of connecting with the braces (9), offset radially in relation to the active part of this washer.

3. The torsion damping device according to claim 1, wherein a toothed slide washer (20) is installed in the plane of the friction washer (60), radially to the inside of the latter.

4. The torsion damping device according to claim 3, wherein the device further comprises, mounted rotatably and coaxially, a hub (10) and a hub disc (11) together with the coupled guiding washers (12A and 12B), the elastic preliminary damping means (35) being interposed between the hub and the disc, and the elastic preliminary damping means are situated axially between the disc (11) and one of the guiding washers (12A), whilst the toothed slide washer is situated axially between the disc and the other guiding washer (12B), elastic loading means (21, 22) for the slide washer (60) bearing against the latter.

5. The torsion damping device according to claim 4, the device further comprises a friction device (25, 26) associated with the preliminary damper, the friction device being situated radially to the inside of the elastic loading means (21, 22) for the slide washer (60).

* * * * *